United States Patent
Kanbara et al.

(10) Patent No.: US 8,287,134 B2
(45) Date of Patent: Oct. 16, 2012

(54) INSTALLATION STRUCTURE OF SENSOR AND PROJECTOR APPARATUS HAVING THE SAME

(75) Inventors: Toshimasa Kanbara, Kishiwada (JP); Taichi Yoshimura, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 511 days.

(21) Appl. No.: 12/630,371

(22) Filed: Dec. 3, 2009

(65) Prior Publication Data

US 2010/0141901 A1 Jun. 10, 2010

(30) Foreign Application Priority Data

Dec. 5, 2008 (JP) .................................. 2008-310981

(51) Int. Cl.
*G03B 21/16* (2006.01)
*G01F 1/34* (2006.01)
(52) U.S. Cl. ........................................ 353/61; 361/695
(58) Field of Classification Search ................... 353/52, 353/57, 58, 61; 361/695, 690; 73/204.21–204.26
See application file for complete search history.

(56) References Cited

U.S. PATENT DOCUMENTS

| 7,535,711 B2 | 5/2009 | Saegusa et al. |
| 2007/0074707 A1* | 4/2007 | Ogawa et al. ............ 123/568.14 |
| 2007/0074725 A1* | 4/2007 | Taya ........................ 128/204.21 |
| 2007/0261824 A1 | 11/2007 | Saegusa et al. |
| 2008/0016959 A1 | 1/2008 | Nakano et al. |

FOREIGN PATENT DOCUMENTS

| CN | 101109653 A | 1/2008 |
| JP | 2007-304481 A | 11/2007 |

OTHER PUBLICATIONS

Chinese Office Action dated Sep. 29, 2011, issued in corresponding Chinese Patent Application No. 200910254113.3.

* cited by examiner

*Primary Examiner* — Seung C Sohn
(74) *Attorney, Agent, or Firm* — Westerman, Hattori, Daniels & Adrian, LLP

(57) ABSTRACT

An airflow rate sensor is provided with a through hole, and a detection unit is disposed inside the through hole. The airflow rate is calculated based on the output voltage resulting from the temperature difference and the like caused in the detection unit by the air flowing through the through hole. A duct is provided with a concave portion so as to protrude from outside the duct toward the inside thereof. The airflow rate sensor is disposed in the duct so as to cover the concave portion, in which the through hole is in communication with the space in the concave portion. The concave portion has a bottom provided with an opening. Accordingly, an installation structure of a sensor for reliably sensing a flow rate and a projector apparatus having the same are provided.

6 Claims, 9 Drawing Sheets

INSTALLATION STRUCTURE OF SENSOR AND PROJECTOR APPARATUS HAVING THE SAME

BACKGROUND OF THE INVENTION

1. Field of the Invention

The present invention relates to an installation structure of a sensor and a projector apparatus having the same, and particularly to an installation structure of a sensor for detecting an airflow rate and an air velocity by sensing the flow of the air suctioned due to the differential pressure, and a projector apparatus to which the installation structure of the sensor is applied.

2. Description of the Background Art

In the projector apparatus, the light emitted from a light source is guided by an optical system to produce an image which is then enlarged and projected onto the screen located toward the front thereof. An example of this projector apparatus will be hereinafter described. As shown in FIG. 7, a projector apparatus 101 has a casing 102 which includes therein an optical system unit 105 for generating an image, a first lamp unit 107 and a second lamp unit 108 each serving as a light source, a control circuit board unit 106 for controlling a series of operations of optical system unit 105, and the like. One of first lamp unit 107 and second lamp unit 108 serves as a spare lamp unit.

During the operation of projector apparatus 101, optical system unit 105 and control circuit board unit 106 generate heat. Furthermore, when the lamp attached to each of first (second) lamp units 107, 108 emits light, first (second) lamp units 107, 108 also generate heat. The heat emitted from optical system unit 105 and first (second) lamp units 107, 108 causes an increase in temperature within casing 102, which may affect the operation of control circuit board unit 106. In addition, the lifetime of each lamp attached to first (second) lamp units 107, 108 may be shortened.

In order to alleviate the above-described defects, a cooling mechanism for cooling the inside of casing 102 is provided in projector apparatus 101. In other words, a first fan 109 and a second fan 110 for introducing the outside air (air) into casing 102 to air-cool the inside of casing 102, and a third fan 111 for introducing the air into first (second) lamp units 107, 108 are disposed within casing 102.

As first fan 109 and second fan 110 are rotated in such a manner that the pressure inside casing 102 is rendered negative relative to the pressure outside casing 102, the outside air (air) is introduced from an inlet port 103 disposed on the side of casing 102 through a filter 114 into casing 102. The air introduced into casing 102 flows through a duct 104 (an arrow 131) to cool optical system unit 105 and control circuit board unit 106.

The air used to cool optical system unit 105 and the like then cools first lamp unit 107 and second lamp unit 108 disposed behind optical system unit 105 and the like, and is subsequently discharged through the rear face of casing 102 to outside thereof. Thus, the inside of casing 102 is air-cooled.

In this series of air-cooling operations, the amount of the air introduced into casing 102 is sensed by an airflow rate sensor 121. As shown in FIG. 8, airflow rate sensor 121 is installed in a predetermined position on the outer surface of duct 104.

As shown in FIG. 9, airflow rate sensor 121 is provided with a through hole 122, within which a detection unit 123 such as a heater is disposed. Duct 104 is provided with an opening 125 having a relatively small diameter (approximately 1 mm), so as to allow adjustment of the inflow rate of the air into airflow rate sensor 121.

When the air flows through duct 104, the pressure inside duct 104 is rendered negative relative to the atmospheric pressure outside duct 104, which causes the air to flow from outside duct 104 via through hole 122 of sensor 121 and opening 125 toward the inside of duct 104. The airflow rate may be calculated based on the output voltage resulting from the temperature difference and the like caused in detection unit 123 by the air flowing through the through hole 122 of airflow rate sensor 121. It is to be noted that Japanese Patent Laying-Open No. 2007-304481 discloses a projector apparatus provided with a cooling mechanism.

The cooling mechanism of the conventional projector apparatus, however, poses the following problems. In order to prevent foreign substances such as dust contained in the air from affecting the optical system unit, filter 114 is disposed in inlet port 103 of duct 104 (see FIG. 7). As shown in FIG. 10, in the state where filter 114 is not clogged at first, a predetermined amount of air (arrow 131) is introduced through filter 114 into casing 102.

Then, a differential pressure (P1−P2) resulting from the flow of the predetermined amount of air is produced between the spaces outside and inside duct 104, which causes the air to flow (an arrow 141) from outside duct 104 via through hole 122 of airflow rate sensor 121 and opening 125 toward the inside of duct 104 (steady state).

Then, as shown in FIG. 11, when filter 114 catches foreign substances and starts getting clogged, the amount of the air taken in through filter 114 gradually decreases (an arrow 132). Accordingly, the pressure inside duct 104 falls below the pressure in the steady state, resulting in an increase in differential pressure (P1−P2) between the spaces inside and outside duct 104. This causes the air to flow through the through hole 122 of airflow rate sensor 121 at a higher velocity (an arrow 142).

However, the diameter of opening 125 in communication with through hole 122 is configured to be smaller than that of through hole 122. Therefore, an increase in flow velocity of the air may prevent the air from smoothly flowing through opening 125. Thus, turbulence tends to occur in the flow of the air (an arrow 143) inside through hole 122 located in front (upstream) of opening 125. This results in variations in the flow rate sensed by detection unit 123 of airflow rate sensor 121, which may prevent sufficient cooling of the inside of casing 102.

SUMMARY OF THE INVENTION

The present invention has been made to solve the above-described problems, and an object of the present invention is to provide an installation structure of a sensor by which a flow rate is reliably sensed. Another object of the present invention is to provide a projector apparatus to which the installation structure of the sensor is applied.

An installation structure of a sensor according to the present invention for detecting at least one of a flow rate and a flow velocity of air includes a flow path through which the air flows, a sensor and a buffering unit. The sensor has a through hole and is configured to detect at least one of the flow rate and the flow velocity of the air flowing through the flow path by sensing the air suctioned through the through hole to the flow path by a differential pressure between a pressure in the flow path and a pressure other than the pressure in the flow path. The buffering unit is disposed downstream of flow of the air suctioned through the through hole of the sensor so as to communicate with the through hole.

More specifically, the installation structure of the sensor includes a duct providing the flow path, and a concave portion provided in the duct as the buffering unit so as to protrude from outside the duct toward the flow path inside the duct. The sensor is disposed in the duct so as to cover the concave portion. The through hole communicates with a space provided by the concave portion and the sensor. The concave portion has an opening for guiding the air introduced into the space to the flow path.

A projector apparatus according to the present invention having the installation structure of the sensor as described above includes a casing, a light source unit, an optical unit, a duct, and an installation structure of a sensor. The light source unit is disposed within the casing. The optical unit is disposed within the casing and configured to modulate light emitted from the light source unit based on a prescribed input image signal and project an image through a projection lens in a projection direction. The duct is disposed within the casing and configured to introduce air outside the casing into the light source unit and the optical unit. The installation structure of the sensor is provided in the duct.

In the projector apparatus, it is preferable that a filter is disposed upstream of the duct for removing foreign substances contained in the air.

According to the installation structure of the sensor of the present invention, since the buffering unit is disposed downstream of the flow of the air suctioned through the through hole of the sensor so as to communicate with the through hole, turbulence occurring in the flow of the air having passed through the through hole should occur within the buffering unit. Consequently, turbulence of the air can be prevented from extending into the through hole, thus allowing the flow rate or the flow velocity of the air to be reliably sensed.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
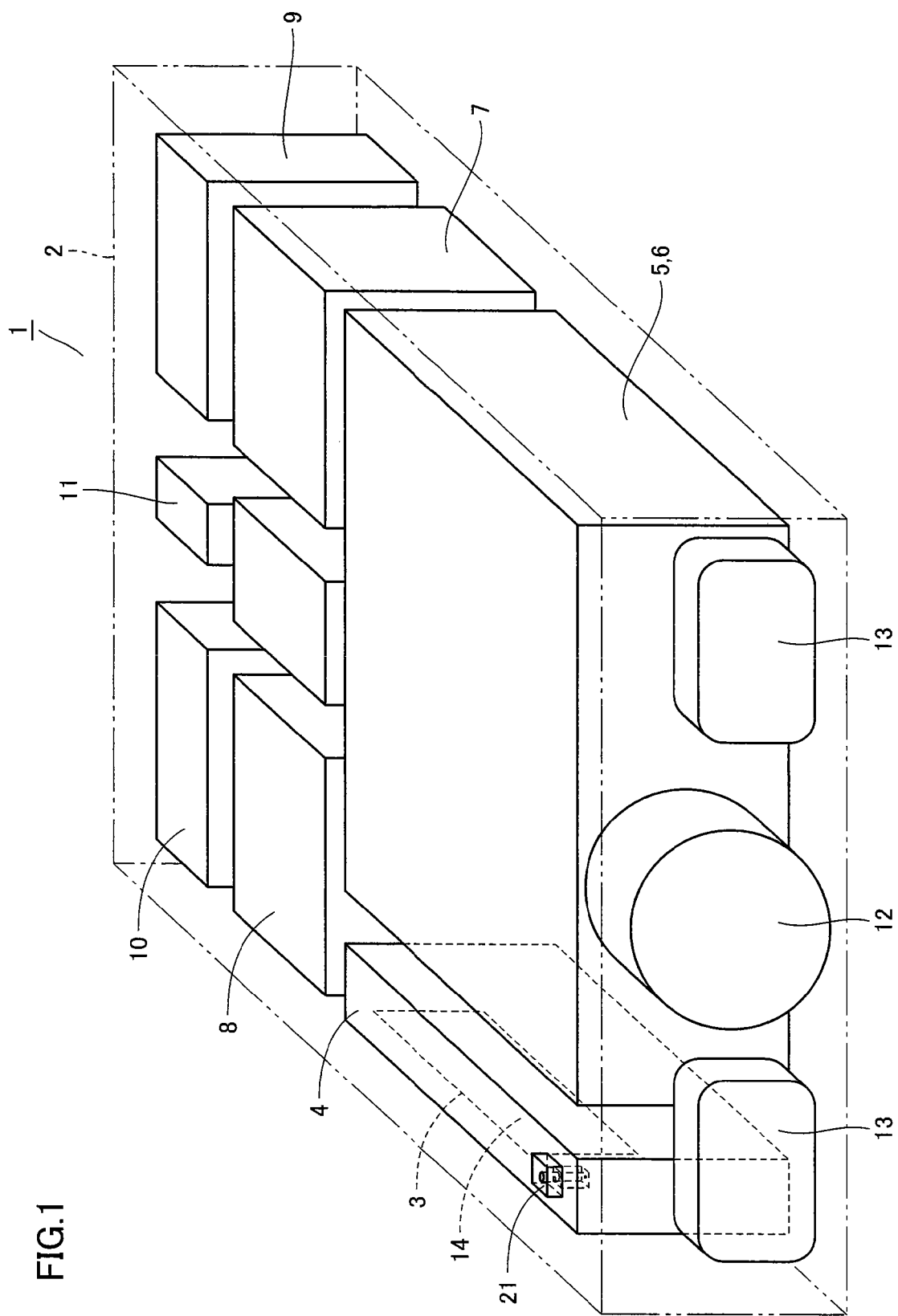
FIG. 1 is a perspective view of an internal structure of a projector apparatus to which an installation structure of a sensor is applied, according to an embodiment of the present invention.

A projector apparatus employing an installation structure of a sensor according to an embodiment of the present invention will be hereinafter described. As shown in FIG. 1, a projector apparatus 1 has a casing 2 which includes therein an optical system unit 5 for generating color image light; a projection lens 12 for projecting an image; a speaker 13 for audio output; a first lamp unit 7 and a second lamp unit 8 each serving as a light source of optical system unit 5; a control circuit board unit 6 for controlling a series of operations of optical system unit 5, and the like. It is to be noted that one of first lamp unit 7 and second lamp unit 8 is assumed to be a spare lamp unit.

Furthermore, a first fan 9 and a second fan 10 for introducing the outside air (air) into casing 2 to air-cool the inside of casing 2, and a third fan 11 for actively supplying the air within casing 2 into first (second) lamp units 7 and 8 are disposed in casing 2 as a cooling mechanism for cooling the inside of casing 2.

An air inlet 3 for taking in the outside air is provided on the side of casing 2. Air inlet 3 is provided with a filter 14 for catching foreign substances such as dust contained in the outside air. A duct 4 for introducing the outside air taken in through air inlet 3 to optical system unit 5 and the like is disposed within casing 2. An airflow rate sensor 21 for sensing the amount or the flow velocity of the outside air (air) introduced into casing 2 is installed in a predetermined position on the outer surface of duct 4.

Figure 2:
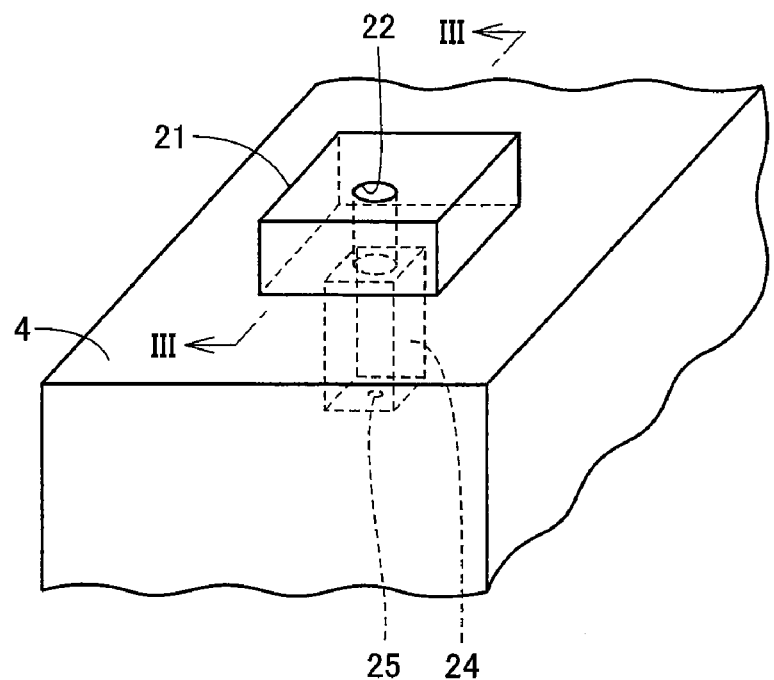
FIG. 2 is a partially enlarged perspective view of the installation structure of the sensor according to the embodiment.
Figure 3:
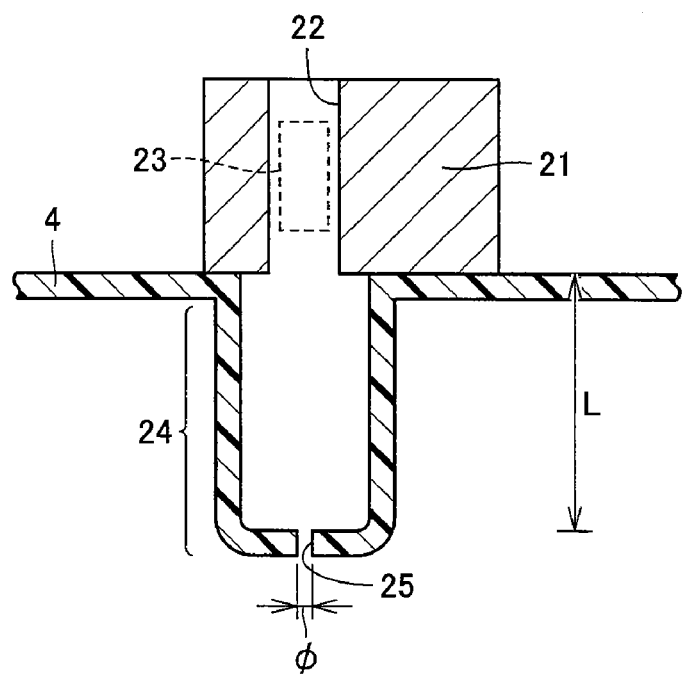
FIG. 3 is a partial cross-sectional view taken along a cross-sectional line shown in FIG. 2, according to the embodiment.

As shown in FIGS. 2 and 3, airflow rate sensor 21 is provided with a through hole 22, and a detection unit 23 such as a heater is disposed inside through hole 22. The airflow rate is calculated based on the output voltage resulting from the temperature difference and the like caused in detection unit 23 by the air flowing through the through hole 22.

Duct 4 is provided with a concave portion 24 as a buffering unit so as to protrude from outside duct 4 toward the inside thereof. Airflow rate sensor 21 is disposed in duct 4 so as to cover concave portion 24, in which through hole 22 is in communication with the space in concave portion 24. Concave portion 24 has a bottom provided with an opening 25 having a predetermined diameter (approximately 1 mm), through which the space within concave portion 24 is in communication with the space through which the air flows.

Figure 4:
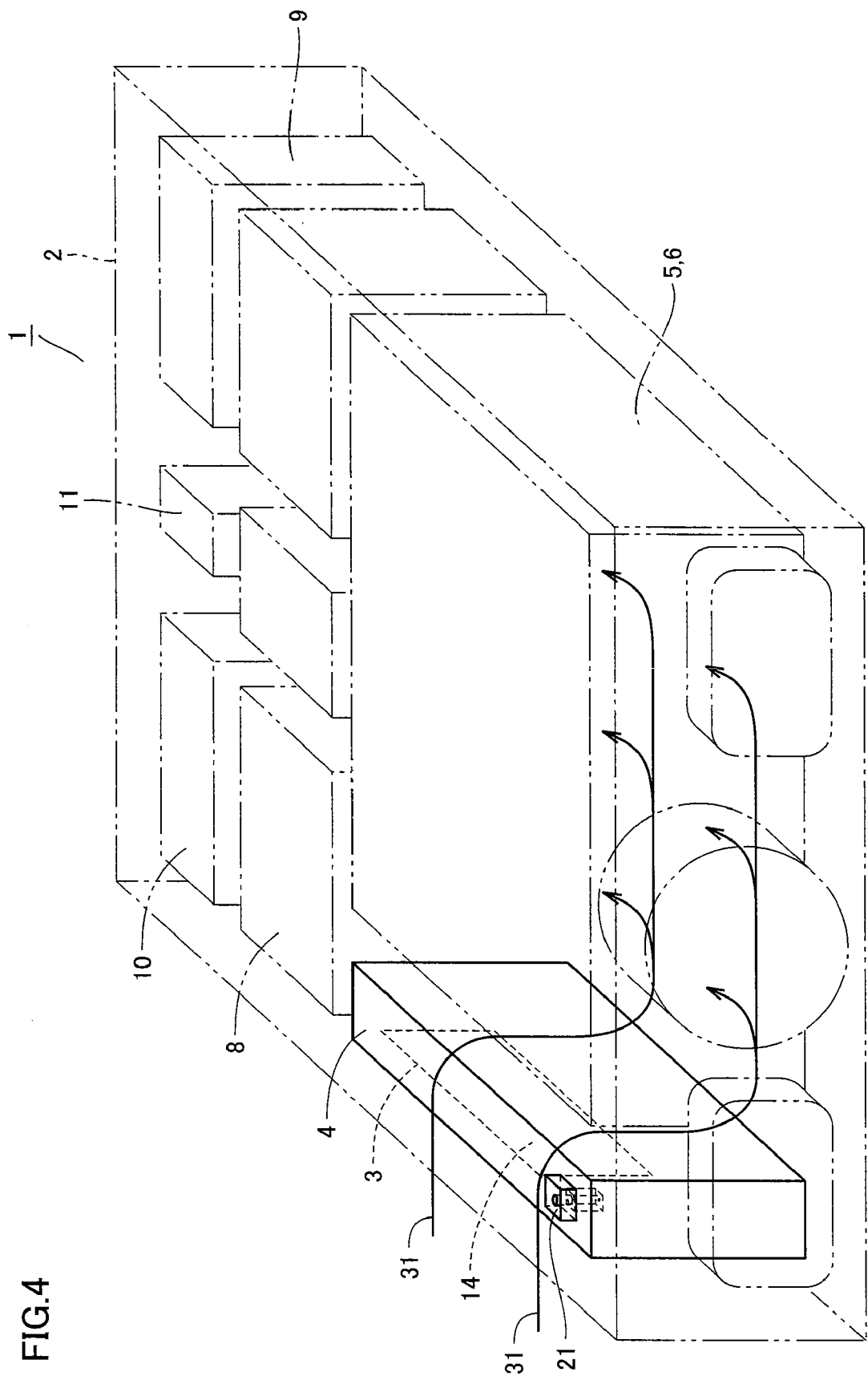
FIG. 4 is a perspective view for illustrating a cooling mechanism in the projector apparatus according to the embodiment.

Then, a series of cooling operations in the above-described projector apparatus 1 will be described. As first fan 9 and second fan 10 are rotated in such a manner that the pressure within casing 2 is rendered negative relative to the atmospheric pressure outside casing 2, the outside air (air) is introduced into casing 2 through air inlet 3 (an arrow 31), as shown in FIG. 4. The air taken in through air inlet 3 passes through filter 14, during which foreign substances such as dust contained in the outside air is caught by filter 14. The air from which the foreign substances are removed flows through duct 4 to cool optical system unit 5 and control circuit board unit 6.

A part of the air used to cool optical system unit 5 and the like is then delivered to first lamp unit 7 and second lamp unit 8 by third fan 11 disposed behind optical system unit 5 and the like, and then cools a lamp section (not shown) of each of first lamp unit 7 and second lamp unit 8. The remaining part of the air used to cool optical system unit 5 and the like cools a section other than the lamp section of each of first lamp unit 7 and second lamp unit 8. The air used to cool each section in first lamp unit 7 and second lamp unit 8 then passes through first fan 9 and second fan 10, and exits through the air outlet (not shown) located on the back face of casing 2 to the outside of casing 2. In this way, the inside of casing 2 is air-cooled.

In the above-described series of cooling operations, the amount of the air introduced into casing 2 is sensed by airflow rate sensor 21. In this case, when the air flows through duct 4, the pressure inside duct 4 is rendered negative relative to the atmospheric pressure outside duct 4, with the result that the air flows from outside duct 4 via through hole 22 of sensor 21 toward the inside of duct 4. As described above, the airflow rate is calculated based on the output voltage resulting from the temperature difference and the like caused in detection unit 23 by the air flowing through the through hole 22 of sensor 21.

Downstream of through hole 22, the above-described cooling mechanism of projector apparatus 1 is provided with a space as a buffering unit which is provided by concave portion 24. Therefore, even if the air having passed through the through hole 22 flows through opening 25 into duct 4 to cause turbulence to occur in the flow of the air in the region in front of opening 25, this turbulence of the flow should occur within concave portion 24, which serves to prevent the turbulence of the air from affecting the flow of the air passing through the through hole 22. This results in a stable flow of the air passing through the through hole 22, thus allowing detection of the airflow rate with higher accuracy, which will be described in further detail below.

Figure 5:
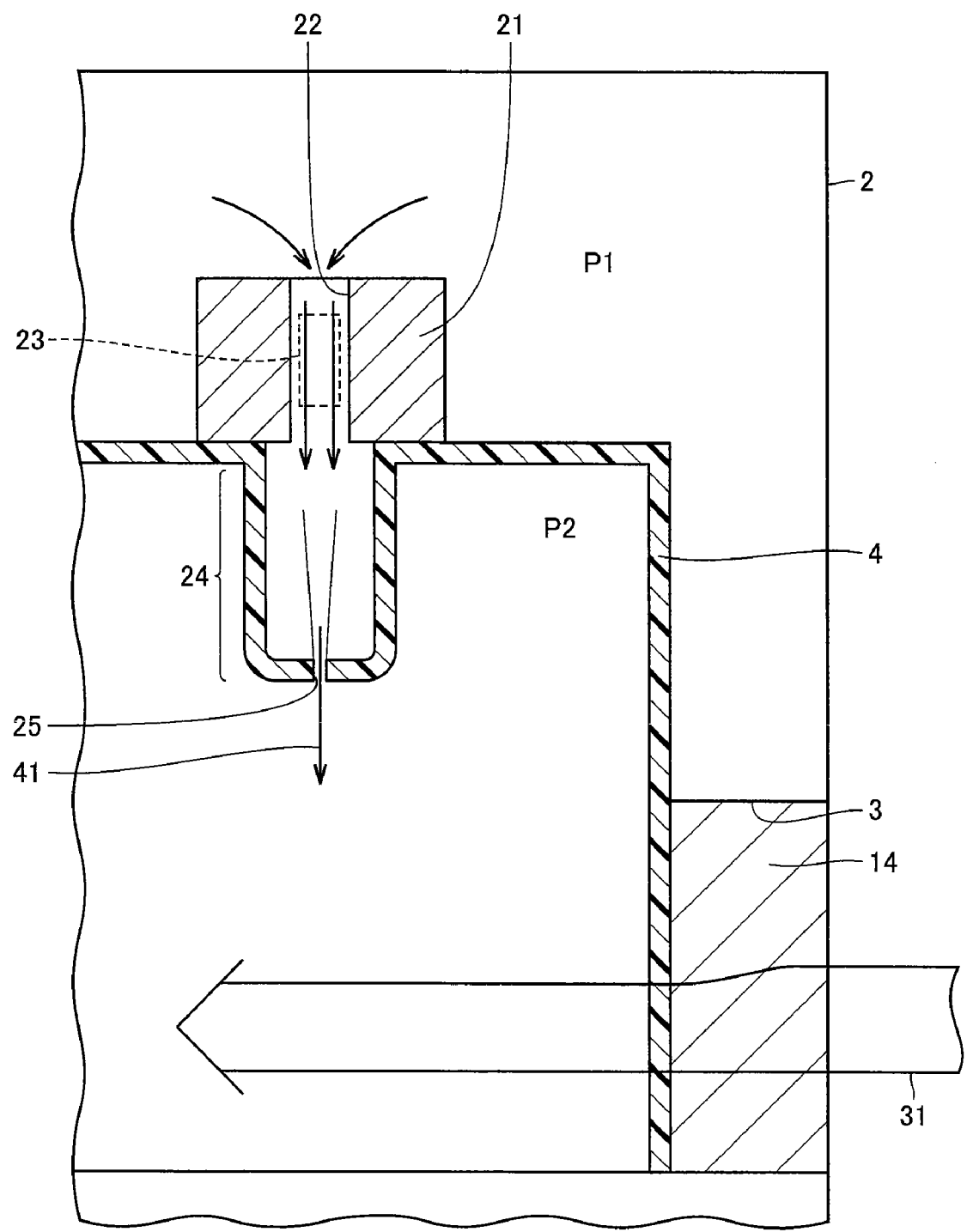
FIG. 5 is the first partial cross-sectional view showing an installation portion of an airflow rate sensor and the proximity thereof for illustrating the flow of the air passing through the airflow rate sensor, according to the embodiment.

First, as shown in FIG. 5, in the state where filter 14 is not clogged (steady state), a predetermined amount of air is introduced through filter 14 into casing 2 (arrow 31), to cause the differential pressure between a pressure P1 outside duct 4 and a pressure P2 inside duct 4 to be a predetermined value. In this case, the air outside duct 4 flows through opening 25 into duct 4 in accordance with the differential pressure as indicated by an arrow 41, during which no turbulence occurs in the flow, particularly, upstream of opening 25.

Figure 6:
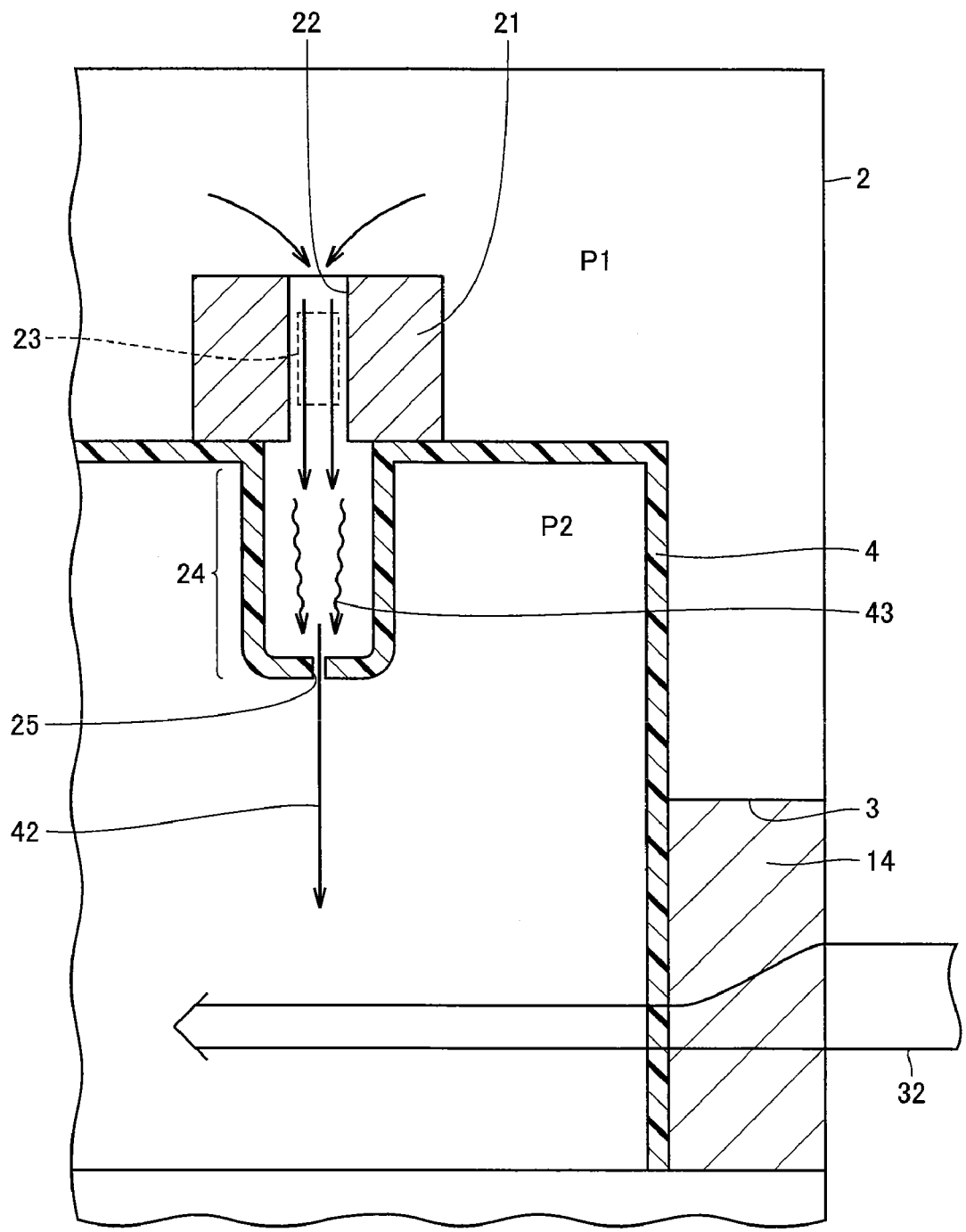
FIG. 6 is the second partial cross-sectional view showing the installation portion of the airflow rate sensor and the proximity thereof for illustrating the flow of the air passing through the airflow rate sensor, according to the embodiment.
Figure 7:
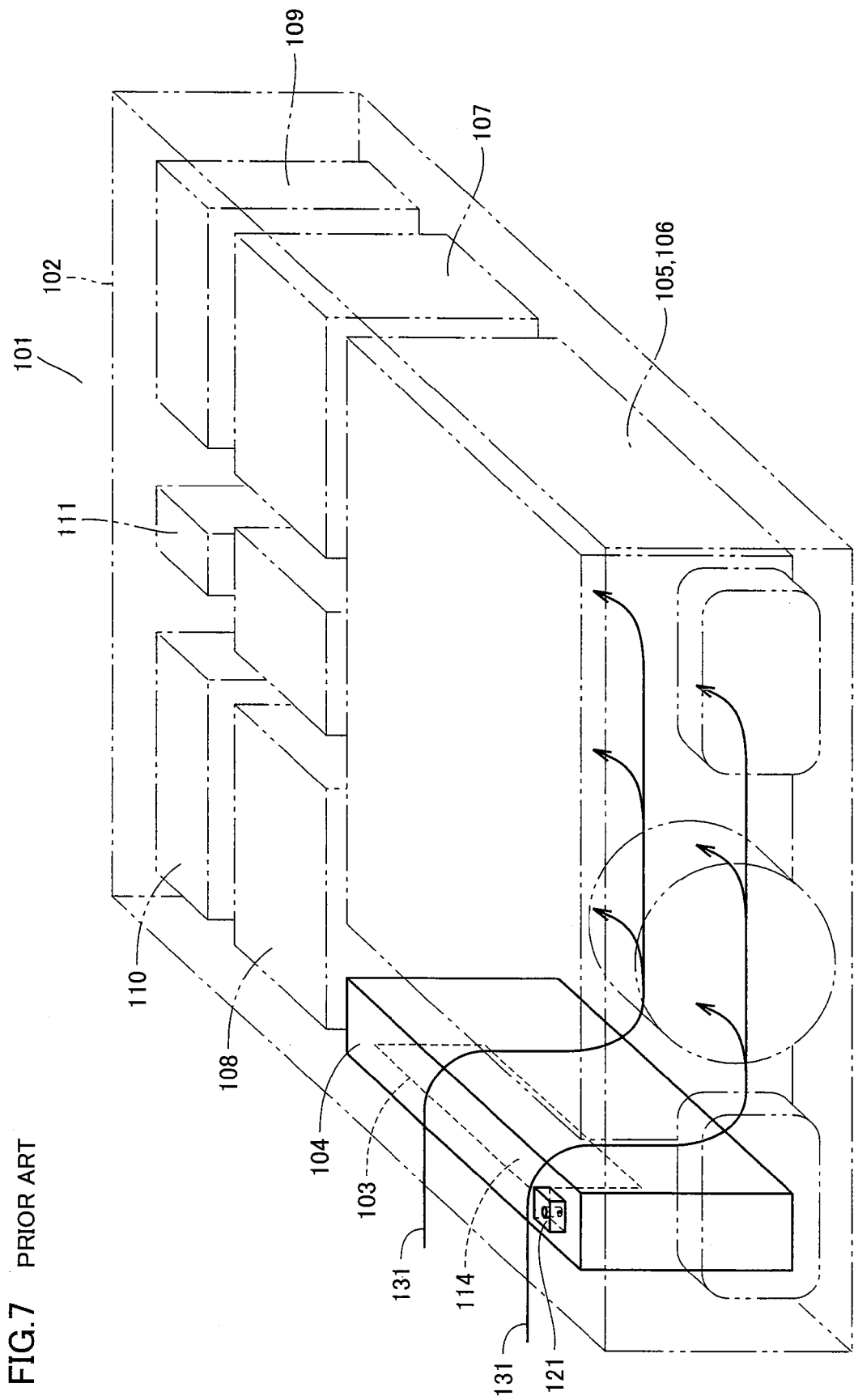
FIG. 7 is a perspective view for illustrating a cooling mechanism in the conventional projector apparatus.
Figure 8:
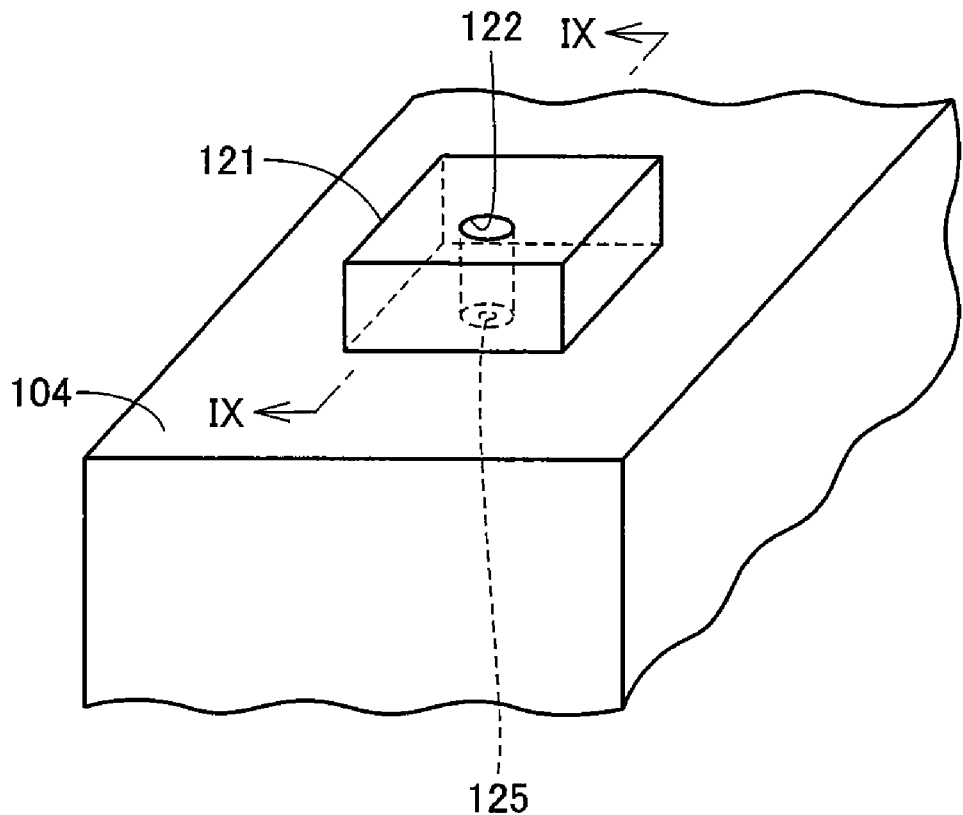
FIG. 8 is a partially enlarged perspective view showing an installation structure of a sensor in the conventional projector apparatus.
Figure 9:
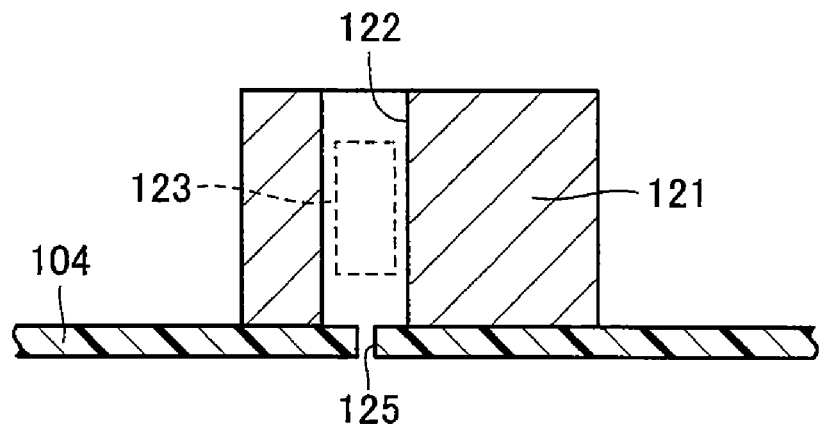
FIG. 9 is a partial cross-sectional view taken along a cross-sectional line IX-IX shown in FIG. 8.
Figure 10:
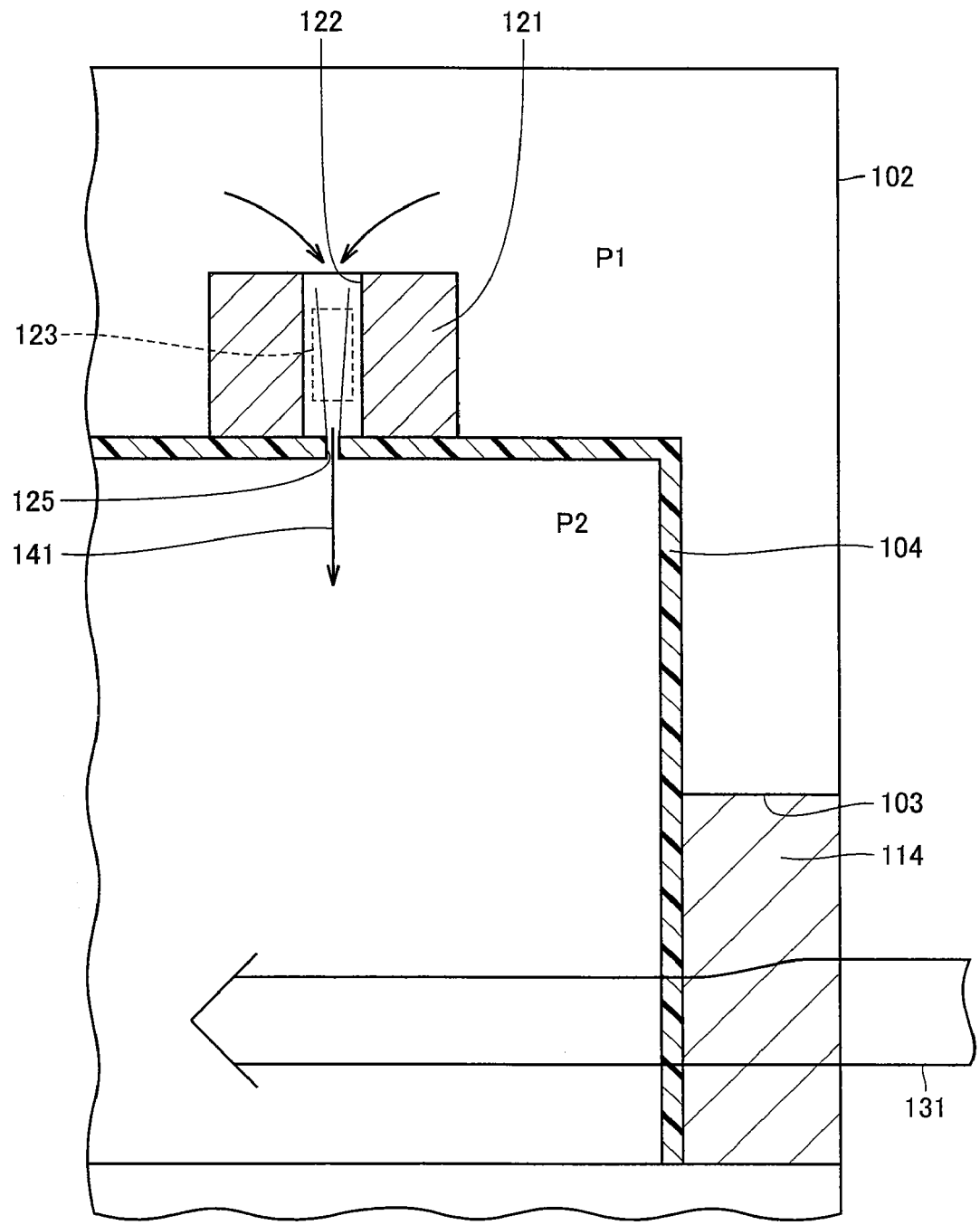
FIG. 10 is the first partial cross-sectional view showing an installation portion of an airflow rate sensor and the proximity thereof for illustrating the flow of the air passing through an airflow rate sensor in the conventional projector apparatus.
Figure 11:
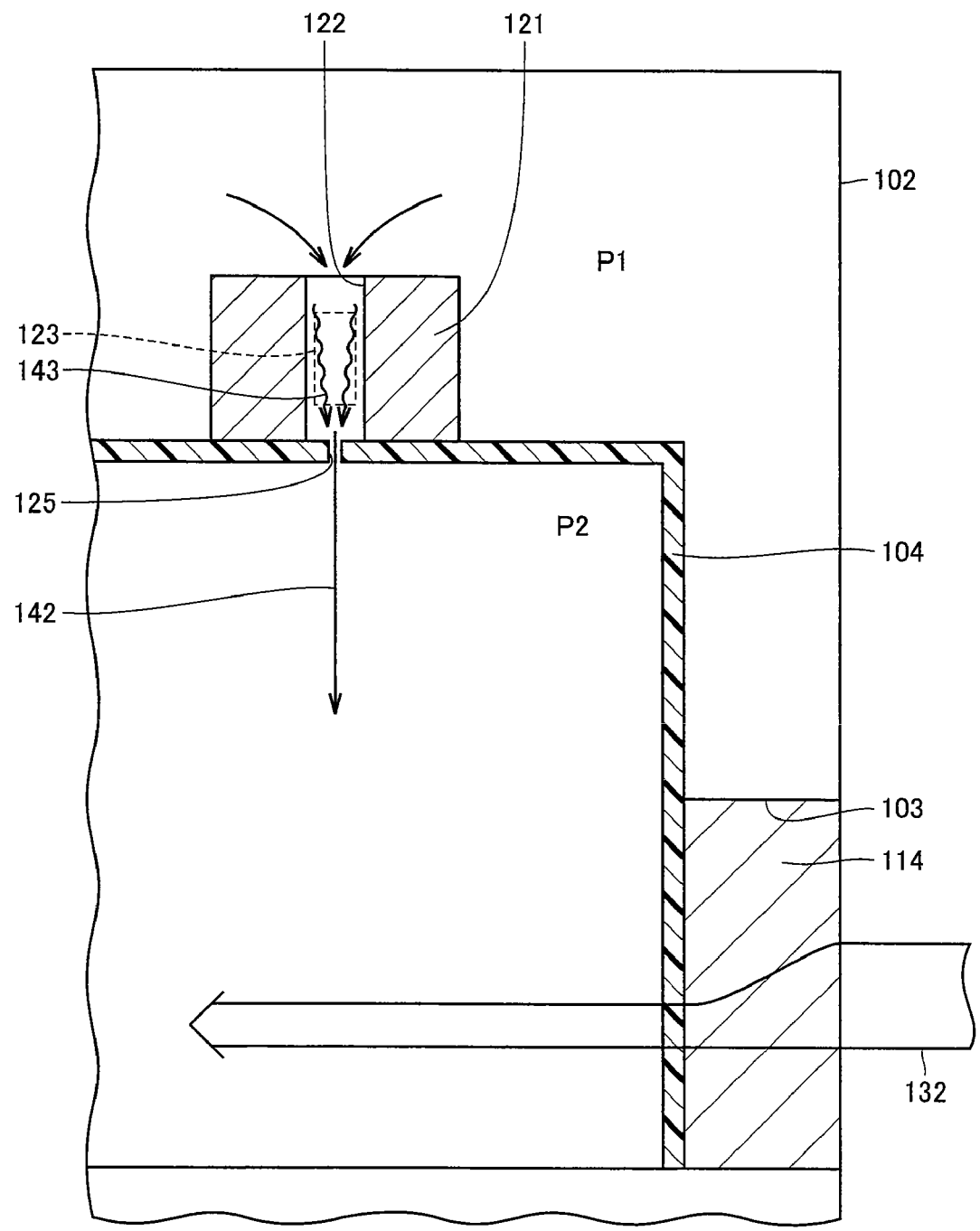
FIG. 11 is the second partial cross-sectional view showing the installation portion of the airflow rate sensor and the proximity thereof for illustrating the flow of the air passing through the airflow rate sensor in the conventional projector apparatus.

However, as shown in FIG. 6, when foreign substances are caught by filter 14 which then starts getting clogged, the amount of the air taken in through filter 14 gradually decreases. In this case, pressure P2 inside duct 4 falls below the pressure in the steady state, which results in an increase in the differential pressure between the spaces inside and outside duct 4. Accordingly, the air outside duct 4 is caused to flow through opening 25 into duct 4 at a higher velocity as indicated by an arrow 42, with the result that the air cannot smoothly flow through opening 25. Consequently, the flow of the air having passed through the through hole 22 tends to be subjected to turbulence in front (upstream) of opening 25 (an arrow 43).

According to this projector apparatus 1, since a space is provided by concave portion 24 between sensor 21 and opening 25, turbulence of the flow of the air (arrow 43) occurs within this space. Therefore, the turbulence occurring in front of opening 25 can be prevented from affecting the air passing through the through hole 22, thus allowing detection unit 23 within through hole 22 to detect the airflow rate with stability.

The inventors have performed evaluations on concave portion 24 providing a space, using various parameters regarding a length L extending from the opening end of concave portion 24 to the bottom thereof and a diameter $\phi$ of opening 25 (see FIG. 3), and found that the airflow rate can be sensed with stability in the case where length L is approximately 13 mm and diameter $\phi$ of opening 25 is approximately 1 mm.

In contrast, it is confirmed that concave portion 24 having length L of approximately 6-7 mm causes the turbulence of the flow in front of opening 25 to extend into through hole 22, and thus, the airflow rate cannot be sensed with stability. If diameter $\phi$ is set to be relatively small, length L should be set to be relatively great. If diameter $\phi$ is set to be relatively large, length L may be set to be relatively short.

Furthermore, according to the configuration in which the space where turbulence of the air occurs is provided as concave portion 24 in duct 4, the space can readily be provided by the molding process.

As described above, according to the installation structure of the sensor of the present invention, since a buffering unit is provided downstream of the flow of the air suctioned through the through hole of the sensor so as to communicate with the through hole, any turbulence occurring in the flow of the air having passed through the through hole should occur within the buffering unit. Consequently, the turbulence of the air can be prevented from extending into the through hole, which allows the flow rate or the flow velocity of the air to be reliably sensed.

Furthermore, according to the configuration in which the concave portion is provided as a buffering unit in such a manner as to protrude from outside the duct toward the flow path inside the duct, the concave portion can readily be integrally provided by the molding process.

Furthermore, according to the projector apparatus of the present invention, the flow rate or the flow velocity of the air can be reliably sensed by providing the installation structure of the sensor as described above. This allows the inside of the projector apparatus to be more appropriately cooled, and also allows the image to be projected onto the screen with stability. The lifetime of the body of the light source of the light source unit can also be prolonged. In addition, even when the filter is clogged, the flow rate or the flow velocity of the air can be reliably sensed. Although the case where the installation structure of the airflow rate sensor is applied to projector apparatus 1 has been described in the above embodiments, the installation structure of the airflow rate sensor is not limited to this projector apparatus but may be applied to any other apparatus which employs the cooling mechanism operating in such a manner as to air-cool the inside of the casing by introducing the outside air into the casing.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An installation structure of a sensor for detecting at least one of a flow rate and a flow velocity of air, comprising:
   a flow path through which the air flows;
   a sensor having a through hole and configured to detect at least one of the flow rate and the flow velocity of the air flowing through said flow path by sensing the air suctioned through said through hole to said flow path by a differential pressure between a pressure in said flow path and a pressure other than the pressure in said flow path; and
   a buffering unit disposed downstream of flow of the air suctioned through said through hole of said sensor so as to communicate with said through hole.

2. The installation structure of the sensor according to claim 1, comprising:

a duct providing said flow path; and a concave portion provided in said duct as said buffering unit so as to protrude from outside said duct toward said flow path inside said duct, wherein said sensor is disposed in said duct so as to cover said concave portion, said through hole communicates with a space provided by said concave portion and said sensor, and said concave portion has an opening for guiding the air introduced into said space to said flow path.

3. A projector apparatus having an installation structure of a sensor according to claim 1, comprising:

a casing;

a light source unit disposed within said casing;

an optical unit disposed within said casing and configured to modulate light emitted from said light source unit based on a prescribed input image signal and project an image through a projection lens in a projection direction;

a duct disposed within said casing and configured to introduce air outside said casing into said light source unit and said optical unit; and the installation structure of the sensor provided in said duct.

4. The projector apparatus according to claim 3, wherein a filter is disposed upstream of said duct for removing foreign substances contained in the air.

5. A projector apparatus having an installation structure of a sensor according to claim 2, comprising:

a casing;

a light source unit disposed within said casing;

an optical unit disposed within said casing and configured to modulate light emitted from said light source unit based on a prescribed input image signal and project an image through a projection lens in a projection direction;

a duct disposed within said casing and configured to introduce air outside said casing into said light source unit and said optical unit; and the installation structure of the sensor provided in said duct.

6. The projector apparatus according to claim 5, wherein a filter is disposed upstream of said duct for removing foreign substances contained in the air.

* * * * *